United States Patent Office 2,846,397
Patented Aug. 5, 1958

2,846,397

WATER-SOLUBLE SALTS OF DERIVATIVES OF 4:4′-DIAMINOSTILBENE-2:2′-DISULFONIC ACID FOR ENHANCING THE BRIGHTNESS OF ORGANIC FIBROUS MATERIAL

Franz Ackermann, Binningen, Switzerland, assignor to Ciba Limited, Basel, Switzerland No Drawing. Application October 2, 1950
Serial No. 188,071

Claims priority, application Switzerland October 14, 1949

15 Claims. (Cl. 252—89)

This invention provides new derivatives of 4:4′-diaminostilbene-2:2′-disulfonic acid of the general formula

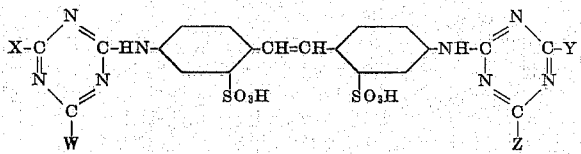

in which W represents an organic radical bound to the carbon atom of the triazine ring by an —O— or —S— bridge, which radical may contain substituents, and X, Y and Z each represent —$NH_2$, the radical of a primary or secondary amine bonded by the nitrogen atom to the triazine ring, chlorine, bromine, or a radical of the kind represented by W, and in which derivatives not more than one of the radicals Y and Z represents chlorine or bromine, or salts of such derivatives.

The invention also includes a process for the manufacture of derivatives of the above general formula or salts thereof, wherein 2 molecular proportions of cyanuric chloride or cyanuric bromide are reacted in any order of succession with (a) 1 molecular proportion of 4:4′-diaminostilbene-2:2′-disulfonic acid or a salt thereof, (b) 1–4 molecular proportions of an aliphatic, aromatic, araliphatic, hydroaromatic of heterocyclic hydroxy- or mercapto-compound or an alkali compound of such hydroxy or mercapto compound and (c) with 0–3 molecular proportions of ammonia of 1–3 molecular proportions of a primary or secondary amine, and wherein a total of 2–4 molecular proportions of compounds specified under (b) and (c) are reacted and the synthesis is so carried out that in the resulting product Y and Z do not both represent chlorine or bromine.

The same compounds can also be prepared by starting from a 4-aminostilbene-2:2′-disulfonic acid which contains in the 4′-position a group convertible into an amino group, such as an acylamino or nitro group.

If 4-nitro-4′-aminostilbene-2:2′-disulfonic acid is used as starting material 1 molecular proportion of cyanuric chloride of cyanuric bromine is reacted with 1 molecular proportion of the aforesaid acid or a water-soluble salts thereof and with a total of 1–2 molecular proportions of compounds specified under (b) and (c), the nitro group in the resulting condensation product is converted by reduction into an amino group, and a further 1 molecular proportion of cyanuric chloride or cyanuric bromine is reacted in any order of succession with 1 molecular proportion of the amino compound so obtained and a total of 1–2 molecular proportions of compounds specified under (b) and (c), the reaction components mentioned under (b) and (c) being used in molecular proportions required by the above described constitution of the final product.

The new compounds of the foregoing formula and also their salts are not dyestuffs in character, but owing to their constitution they possess a more or less pronounced affinity for a very wide variety of substrata, such as vegetable and animal fibers. On these substrata they exhibit in ultraviolet light a blue to violet fluorescence. By virtue of this property the products of the invention are capable of improving the white appearance of undyed materials and the purity of color of dyed materials.

Among the hydroxy- and mercapto-compounds to be used as starting materials there may be used in the aliphatic series saturated, unsaturated, straight or branched chain alcohols and mercaptans containing, for example, 1–10 carbon atoms, which may contain in addition to a hydroxyl or mercapto group further substituents such as halogen atoms, carboxyl or sulfonic acid groups or polyalkylene-glycol radicals. Especially suitable, however, are the members of this series of lower molecular weight containing 1–6 carbon atoms such, for example, as methyl alcohol, ethyl alcohol, propyl alcohol, isopropyl alcohol, alkyl alcohol, butyl alcohol, secondary-butyl alcohol, tertiary-butyl alcohol, hexyl alcohol, 2-ethyl-butanol, hydroxyethane sulfonic acid, allyl mercaptan, amyl mercaptan, thio-glycollic acid or thioethylene glycol. The aromatic members of these classes of compounds may be derived from any desired aromatic compounds, but above all from benzene or naphthalene. In addition to an HO- or HS-group they may contain, if desired, further substituents such as halogen atoms, alkyl groups, etherified hydroxyl groups, acylated or dialkylated amino groups, or carboxylic acid or sulfonic acid groups. There may be mentioned phenol, ortho- or meta- or para-chlorophenol, 2:4-dichlorophenol, ortho- or meta- or para-cresol, halogenated cresols, para-bromophenol, naphthols, para-tertiary-butyl-phenol, salicylic acid, para-hydroxybenzoic acid, phenol sulfonic acids, thymol, guaiacol, or thiophenol and substitution products thereof. Among araliphatic hydroxy-compounds there may be used above all benzyl alcohol and nuclear substitution products thereof, such as para-tolyl carbinol, 2′-hydroxy-1,2-dimethyl-4-isopropyl-benzene, and also tetrahydronaphthyl carbinols such as ar-tetrahydro-α- or ar-tetrahydro-β-naphthyl carbinol or mixtures thereof.

As members of the heterocyclic series for use as starting materials there may be mentioned 2-mercapto-thiazoline, 2 - hydroxybenzthiazole and 2 - mercapto-benzthiazole.

As primary or secondary amines for use in the present invention there may be used aliphatic, aromatic, araliphatic or heterocyclic amines. As aliphatic amines there are used advantageously alkylamines, dialkylamines, hydroxyalkylamines, bis - (hydroxyalkyl) - amines and N′:N′-dialkyl-alkylene diamines. Either straight chain or branched chain, saturated or unsaturated members of these classes of compounds containing, for example, 1–18 carbon atoms may be used. Especially suitable are those containing 1–4 carbon atoms in the carbon chain. There may be mentioned for example, methylamine, ethylamine, propylamine, isopropylamine, butylamine, isobutylamine, allylamine, mono-ethanolamine, di-isobutylamine and N′:N′-dimethylethylene diamine. However, there may also be used aliphatic amines substituted in the alkyl radical such, for example, as taurine.

The aromatic amines may be mono- or polynuclear and may if desired contain further substituents. Advantageously aniline or a nuclear substitution product thereof is used such, for example, as ortho- or para-toluidine, various chloranilines, ortho- or para-anisidine and the like. However, naphthylamines, such as α- or β-naphthylamine or nuclear substitution products of these compounds may be used in the present invention.

Heterocyclic amines which can be used in the present invention may contain 1 or more heterogen atoms. There may be mentioned piperidine, α-pipecoline, morpholine, pyrrolidine, imidazoline, benzimidazole, 2-aminothiazole, 5-aminotetrazole and tetrahydroquinoline.

As salts of products used in the invention there may be used above all water-soluble salts with ammonia or amines, but advantageously the alkali metal salts.

The new derivatives of 4:4'-diaminostilbene-2:2'-disulfonic acid of the present invention may be made, for example, by reacting 2 molecular proportions of cyanuric chloride by a method generally known for reacting it with amines, for example in the presence of water or a mixture of water with an organic solvent, such as acetone, and if the desired in the presence of buffers or acid-binding agents, such as sodium acetate, alkali carbonates or alkali hydroxides with 1 molecular proportion of 4:4'-diaminostilbene-2:2'-disulfonic acid or a salt thereof, and then reacting the resulting 4:4'-bis-[2:4-dichloro-1:3:5-triazyl-(6)-amino]-stilbene-2:2'-disulfonic acid or a salt thereof, if desired in the presence of a buffer or acid-binding agent, such as sodium acetate or an alkali carbonate or alkali hydroxide, with 2 or 4 molecular proportions of a hydroxy or mercapto compound of the kind described above or an alkali compound thereof. It is also possible first to react 4:4'-bis-[2:4-dichloro-1:3:5-triazyl-(6)-amino]-stilbene-2:2'disulfonic acid with 2 molecular proportions of a hydroxy or mercapto compound and then with 2 molecular proportions of ammonia or 2 molecular proportions of 1 of the aforesaid amines.

In this manner symmetrical products are obtained.

If it is desired to produce asymmetrically substituted compounds there is advantageously used as starting material a 4-nitro-4'-aminostilbene-2:2'-disulfonic acid. The latter compound is condensed by a method in itself known with cyanuric chloride to form 4-nitro-4'-[2:4-dichloro - 1:3:5 - triazyl-(6)-amino]-stilbene-2:2'-disulfonic acid, and then at least one of the two chlorine atoms is exchanged by reaction with a compound mentioned under (b) and (c) above.

Alternatively, 1 or 2 chlorine atoms of the cyanuric chloride may first be exchanged by reaction with 1–2 mols of a compound mentioned under (b) or (c) and the condensation with 4-nitro-4'-aminostilbene-2:2'-disulfonic acid carried out thereafter.

The nitro group in the condensation product so obtained is converted into an amino group by reduction, for example, with iron in the presence of an acid, and the amino group may be substituted in a manner analogous to that described above in connection with the other amino group, a total of at least one molecular proportion of a compound mentioned under (b) being brought into reaction.

The production of asymmetrical products can also be carried out by starting from 4:4'-diaminostilbene-2:2'-disulfonic acid, by first reacting the latter with 2 molecular proportions of cyanuric chloride, and reacting the condensation product so obtained with a total of 2–4 molecular proportions of compounds mentioned under (b) and (c), at least 1 molecular proportion of a compound mentioned under (b) entering into reaction.

It is also possible to react cyanuric chloride in any order of succession depending on the constitution of the final product first with the compounds under (b) and (c) and then with 4:4'-diaminostilbene-2:2'-disulfonic acid.

The two last mentioned methods generally lead to mixtures of different products, which however, possess substantially the same properties, as the pure compounds.

In the reactions illustrated above cyanuric bromide may be used instead of cyanuric chloride.

Among the compounds obtainable by the invention the following may be especially mentioned:

A. Compounds having combinations of substituents falling within the general formula

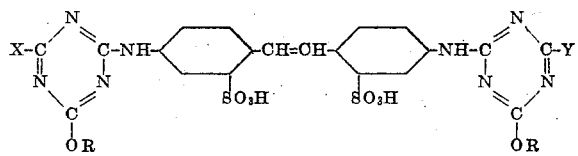

in which R represents an aliphatic, aromatic, araliphatic, hydroaromatic or heterocyclic radical, which may contain substituents, X and Y represent —NH₂ or the radical of a primary or secondary amine which is bound to the triazine ring by means of the nitrogen atom.

Compounds of this kind are for example 4:4'-bis-[2-(ortho-chlorophenoxy) - 4 - hydroxyethylamino-1:3:5-triazyl-(6)-amino]-stilbene-2:2'-disulfonic acid, 4:4' - bis-[2-methoxy-4-bis-(β-hydroxyethyl)-amino - 1:3:5 - triazyl-(6)-amino]-stilbene-2:2'-disulfonic acid, 4:4' - bis-[2-benzyloxy-4-methylamino - 1:3:5 - triazyl - (6) - amino]-stilbene-2:2'-disulfonic acid, 4:4' - bis - [2-cyclohexyloxy-4-(β-hydroxyethylamino) - 1:3:5 - triazyl-(6)-amino]-stilbene-2:2'-disulfonic acid, 4:4' - bis - [2-para-methoxyphenoxy-4-(β-hydroxyethylamino) - 1:3:5-triazyl - (6) - amino]-stilbene-2:2'-disulfonic acid, and also 4:4'-bis-[2-phenoxy-4-morpholino-1:3:5-triazyl-(6)-amino]-stilbene - 2:2' - disulfonic acid of the formula

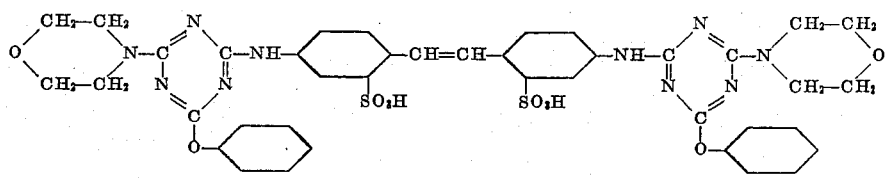

or salts of the foregoing compounds.

B. Compounds of the general formula

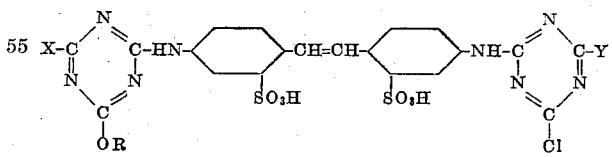

in which R represents an aliphatic, aromatic, araliphatic, hydroaromatic or heterocyclic radical, which may contain substituents, X and Y represent —NH₂ or the radical of a primary or secondary amine, for example, 4-[2-phenoxy - 4 - (β-hydroxyethyl)-amino - 1:3:5 - triazyl-(6)-amino]-4'-[2-chloro-4-bis-(β-hydroxyethyl) - amino-1:3:5-triazyl-(6)-amino]-stilbene - 2:2' - disulfonic acid of the formula

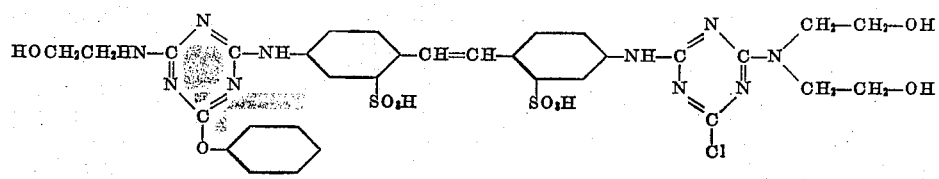

C. Compounds of the general formula

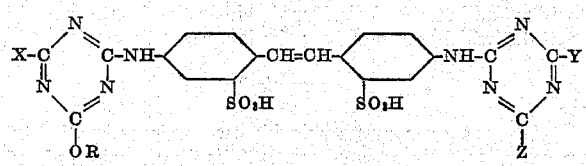

in which R represents an aliphatic, aromatic, araliphatic, hydroaromatic or heterocyclic radical, which may contain substituents, and X, Y and Z represent —$NH_2$ or the radical of a primary or secondary amine which is bound by the nitrogen atom to the triazine ring.

Compounds of this kind are, for example, 4-[2-phenoxy-4-methylamino-1:3:5-triazyl-(6)-amino] - 4'-[2:4-dimethyl-amino-1:3:5-triazyl-(6)-amino]-stilbene-2:2' - disulfonic acid; 4-[2-(ortho-methyl-phenoxy)-4-bis-(β-hydroxyethyl)-amino-1:3:5-triazyl-(6)-amino] - 4' - [2-methylamino-4-β-hydroxyethylamino - 1:3:5 - triazyl - (6) - amino]-stilbene-2:2'-disulfonic acid of the formula

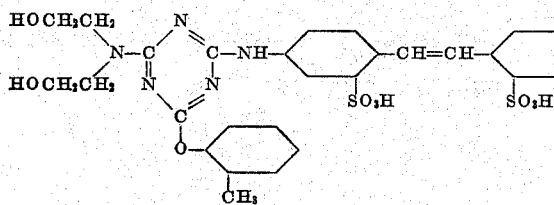

or 4-[2-(ortho-methyl-phenoxy)-4-bis-(β-hydroxyethyl) - amino-1:3:5-triazyl - (6) - amino] - 4' - [2:4-diamino-1:3:5-triazyl-(6)-amino]-stilbene-2:2'-disulfonic acid; 4-[2-phenoxy-4-β-hydroxyethylamino-1:3:5-triazyl-(6)-amino] - 4'-[2-ethylamino-4-ortho-anisidino-1:3:5-triazyl(6)-amino] - stilbene-2:2'-disulfonic acid, or 4-[2-(parasulfophenoxy)-4-ethylamino-1:3:5-triazyl - (6) - amino]-4'-[2:4-di-(ortho-chloranilino)-1:3:5-triazyl - (6) - amino]-stilbene-2:2'-disulfonic acid or 4-[2-phenoxy-4-methylamino-1:3:5-triazyl-(6)-amino]-4' - [2-anilino - 4 - methylamino-1:3:5-triazyl-(6)-amino]-2:2'-disulfonic acid.

D. Compounds of the general formula

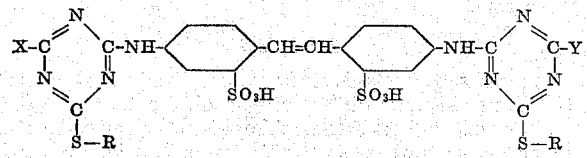

in which R represents an aliphatic, aromatic, araliphatic, hydroaromatic or heterocyclic radical, and X and Y each represent —$NH_2$ or the radical of a primary or secondary amine.

Compounds of this kind are, for example, 4:4'-bis-[2-ethyl-thio - 4 - (β - hydroxyethylamino) - 1:3:5 - triazyl-(6)-amino]-stilbene-2:2'-disulfonic acid, 4:4' - bis-[2-phenyl-thio-4 - (β-hydroxyethylamino) - 1:3:5 - triazyl-(6)-amino]-stilbene-2:2'-disulfonic acid, or 4:4'-bis-[2-phenylthio-4-morpholino-1:3:5-triazyl-(6)-amino]-stilbene - 2:2' - disulfonic acid, and also salts of these compounds.

E. Compounds of the general formula

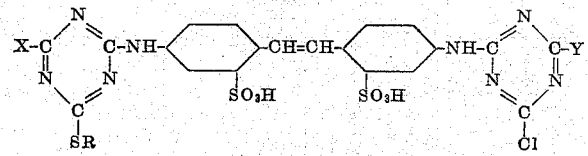

in which R represents an aliphatic, aromatic, araliphatic, hydroaromatic or heterocyclic radical, and X and Y each represent —$NH_2$ or the radical of a primary or secondary amine which is bound by the nitrogen atom to the triazine ring.

F. Compounds of the general formula

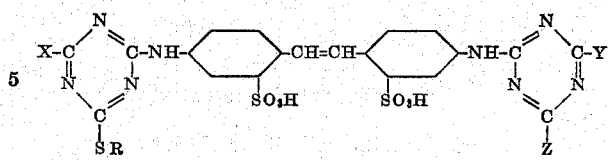

in which R has the meaning given under D and X, Y and Z each represent —$NH_2$ or the radical of a primary or secondary amine bound by the nitrogen atom to the triazine ring.

G. Compounds of the general formula

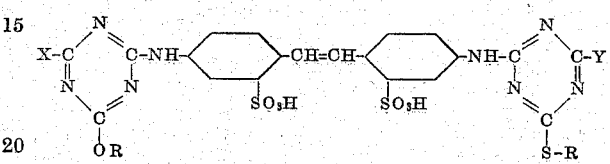

in which R has the meaning given under C, and X and

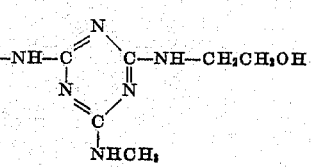

Y represent —$NH_2$ or the radical of a primary or secondary amine bound by the nitrogen atom to the triazine ring.

The compounds of this invention can be used by impregnating the material to be improved with solutions, especially aqueous solutions, of the compounds in question and drying the material, after centrifuging or squeezing it. For example, white goods, especially after an ordinary washing operation, may be after-treated with the compounds of the invention. Moreover, the new products can be used for after-treating printed cellulose materials.

The compounds of the invention may also be applied to materials for improving them in the course of manufacture, for example, by adding them to a paper pulp.

Small quantities of the compounds of the present invention generally suffice to produce an improvement, that is to say to improve the whiteness of undyed fibrous materials or the purity of color of dyed fibrous materials.

The compounds of the invention may also be used in admixture with auxiliary substances such as are used for improving fibrous materials, for example, in conjunction with washing agents, for example, with soaps, salts of sulfonated washing agents, for example, salts of sulfonated benzimidazoles substituted at the 2-carbon atom by an alkyl radical of high molecular weight, and salts of monocarboxylic acid esters of 4-sulfophthalic acid with fatty alcohols of high molecular weight, or in conjunction with fatty alcohol sulfonates or condensation products of higher fatty acids with aliphatic hydroxy- or aminosulfonic acids. In this manner the material to be improved can be simultaneously washed and bleached. An especially pronounced brightening effect is obtained by treating undyed vegetable or animal fibers, especially cotton or wool, with such mixtures containing washing agents.

As materials which can be improved in accordance with the invention, there may be mentioned the following:

Nitrogenous natural or artificial materials such as wool, silk or synthetic polyamide fibers; also cellulose materials such as cellulose, paper, and textile materials of cotton, linen, regenerated cellulose including staple fibers of regenerated cellulose; and finally synthetic materials, for example, those produced by polymerization. The best effects are obtained, however, on vegetable and animal fibers. The material to be improved may be in any desired form, for example, in the form of fibers or films. Furthermore, the material may be, for example, undyed, dyed or printed.

The following examples illustrate the invention, the parts being by weight unless otherwise stated and the relationship of parts by weight to parts by volume being the same as that of the kilogram to the liter:

*Example 1*

A solution, neutralized with sodium carbonate of 18.5 parts ofg 4:4'-diaminostilbene-2:2'-disulfonic acid is added in the course of about 10 minutes at 0–5° C. to 18.5 parts of cyanuric chloride suspended in finely divided form in a mixture consisting of 50 parts of acetone, 100 parts of water and 100 parts of ice. Then, a solution of 5.5 parts of sodium carbonate in 50 parts of water are introduced dropwise in the course of 1 hour so that the reaction mixture has a weakly acid to neutral reaction throughout, the temperature being allowed to rise slowly to 10° C. To the neutral reaction mixture so obtained containing no more starting material are added 9.5 parts of phenol, the temperature is raised to 40–45° C. and the whole is stirred for 3 hours at that temperature while adding 100 parts of a normal solution of caustic soda so that the reaction mass has a neutral to weakly alkaline reaction throughout. To the neutral mixture, 7 parts of monoethanolamine are added, the temperature is raised to 75° C. in the course of 2–3 hours and stirring is continued for 5 hours at that temperature, while the hydrochloric acid formed is neutralized by the gradual addition of a solution of 5.3 parts of sodium carbonate in 50 parts of water. The whole is then allowed to cool, whereupon part of the resulting condensation product precipitates in the form of a solid powder. By adding sodium chloride the remainder of the condensation product is precipitated. The whole is filtered, the residue is washed with sodium chloride solution and the resulting disodium salt of 4:4'-bis-[2-phenoxy-4-(β-hydroxyethylamino)-1:3:5-triazyl-(6)-amino]-stilbene-2:2'-disulfonic acid of the formula 2:2'-disulfonic acid or of 4:4'-bis-[2-(para-methoxyphenoxy)-4-(β-hydroxyethylamino)-1:3:5-triazyl-(6)-amino]-stilbene-2:2'-disulfonic acid in the form of a pale powder which exhibits very similar properties.

*Example 2*

18.5 parts of cyanuric chloride are condensed with 18.5 parts of 4:4'-diaminostilbene-2:2'-disulfonic acid and 9.5 parts of phenol in the manner described in Example 1; there are added, to the reaction mixture heated at 40–45° C., 27 parts of an aqueous monoethylamine solution of 50 percent strength, the temperature is raised to 60° C. and the whole is stirred for about 24 hours at 60° C. The whole is then allowed to cool, the resulting condensation product is separated by the addition of sodium chloride, and the product is separated by filtration, washed with sodium chloride solution and dried. The resulting disodium salt of 4:4'-bis-[2-phenoxy-4-ethylamino-1:3:5-triazyl-(6)-amino]-stilbene-2:2'-disulfonic acid of the formula

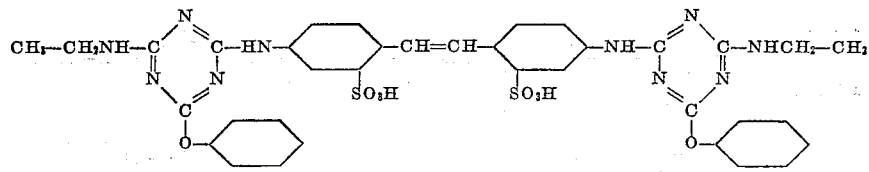

is a slightly yellowish powder whose aqueous solutions exhibit a violet-blue fluorescence in ultraviolet light.

By using instead of 27 parts of a monoethanolamine solution of 50 percent strength, an equivalent quantity of dimethylamine, N':N'-diethylethylene diamine or morpholine, the following compounds are obtained in the form of yellowish powders having similar properties: the disodium salt of 4:4'-bis-[2-phenoxy-4-dimethylamino-1:3:5-triazyl-(6)-amino]-stilbene-2:2'-disulfonic acid; the disodium salt of 4:4'-bis-[2-phenoxy-4-morpholino-1:3:5-triazyl-(6)-amino]-stilbene-2:2'-disulfonic acid, the disodium salt of 4:4'-bis-[2-phenoxy-4-(N':N'-diethyl-ethylenediamino)-1:3:5-triazyl-(6)-amino-stilbene-2:2' - disulfonic acid.

*Example 3*

2.4 parts of metallic sodium are dissolved at about 60° C. in 100 parts of 2-chlorophenol, 6 parts of the disodium salt of 4:4'-bis-[2-chloro-4-methylamino-1:3:5-triazyl-(6)-amino]-stilbene-2:2'-disulfonic acid are then added and the whole is stirred for 3–4 hours at a temperature of 80° C. The resulting reaction mixture is then

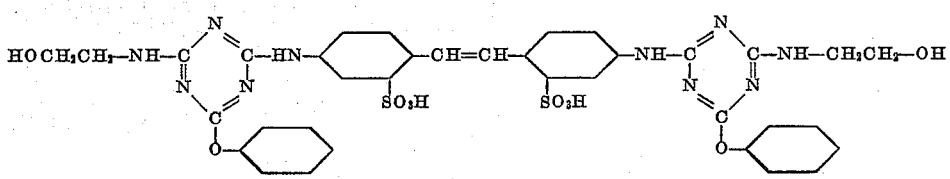

is dried. It is a pale yellow powder, which is soluble in water. Wool which has been treated with an aqueous solution of this product in the presence of an acid, for example, acetic acid, has a whiter appearance than wool which has been treated without this addition.

By using instead of 9.5 parts of phenol an equimolecular quantity of 2-chlorophenol or 4-methoxyphenol in the reaction described above, there is obtained the disodium salt of 4:4'-bis-[2-(ortho-chlorophenoxy)-4-(β-hydroxyethylamino)-1:3:5-triazyl-(6) - amino] - stilbene-introduced at 0–10° C. into a sodium hydroxide solution, and the condensation product so obtained is precipitated by the addition of sodium chloride, the product is separated by filtration and washed with an aqueous solution of sodium chloride until neutral and free from chlorophenol. After drying the disodium salt of 4:4'-bis-[2-(ortho-chlorophenoxy)-4-methylamino-1:3:5-triazyl-(6)-amino]-stilbene-2:2'-disulfonic acid is obtained in the form of a pale powder, aqueous solutions of which are suitable for brightening vegetable or animal materials.

Example 4

5.4 parts of 4-amino-4'-[2-methylamino-4-(β-hydroxyethylamino)-1:3:5-triazyl-(6)-amino]-stilbene-2:2'-disulfonic acid of the formula

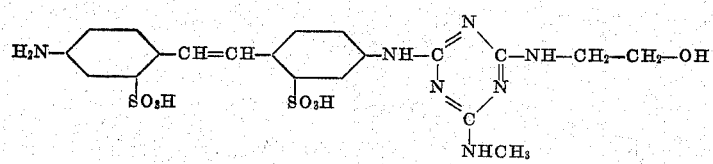

are stirred with 50 parts of water and neutralized with sodium carbonate. The resulting solution is added in the course of 5 minutes to an aqueous suspension of 2 parts of finely divided cyanuric chloride at 0–5° C., and the reaction mass is then neutralized at 0–10° C. by means of a solution of 0.5 part of sodium carbonate in 5 parts of water. As soon as the starting material can no longer be detected, 1.1 parts of ortho-cresol are added, the temperature is allowed to rise to 40–45° C., and 10 parts of a normal solution of caustic soda are gradually added dropwise in the course of 3 hours so that the reaction mass is maintained neutral to very slightly alkaline throughout. 1.1 parts of diethanolamine are then added to the neutral mixture, the temperature is raised to 70–75° C., and the whole is stirred for 6 hours at that temperature, while the hydrochloric acid formed is neutralized by the gradual addition of 0.5 part of sodium carbonate in 5 parts of water. The whole is then allowed to cool, sodium chloride is added, the precipitated condensation product is separated by filtration, washed with aqueous sodium chloride solution and dried. The disodium salt of 4-[2-(ortho-methylphenoxy)-4-bis-(β - hydroxyethyl)-amino-1:3:5-triazyl-(6)-amino]-4'-[2-methyl - amino - 4-(β-hydroxyethylamino)-1:3:5-triazyl - (6) - amino] - stilbene-2:2'-disulfonic acid of the formula

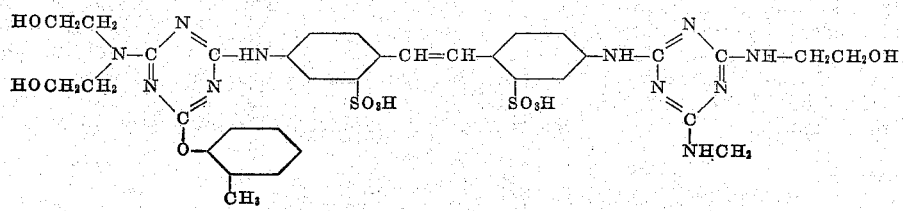

is obtained in the form of a pale powder, which dissolves in water to give a bluish fluorescence in ultraviolet light.

By using as starting material, instead of 5.4 parts of 4-amino-4'-[2-methylamino - 4 - (β - hydroxyethylamino]-1:3:5-triazyl-(6)-amino]-stilbene-2:2'-disulfonic acid, an equivalent quantity of 4-amino-4'-[2:4-diamino-1:3:5-triazyl-(6)-amino]-stilbene-2:2'-disulfonic acid there is obtained a product having similar properties.

A mixture of products having properties similar to those of the above described compound is obtained by condensing 1 molecular proportion of 4:4'-diaminostilbene-2:2'-disulfonic acid with 2 molecular proportions of cyanuric chloride, condensing the condensation product with 1 molecular proportion of ortho-cresol and finally reacting the product with 1 molecular proportion each of diethanolamine, ethanolamine and methylamine.

The 4-amino-4'-[2-methylamino-4 - (β - hydroxyethylamino)-1:3:5-triazyl-(6)-amino]-stilbene - 2:2'disulfonic acid used as starting material may be prepared as follows:

A solution of 20 parts of cyanuric chloride in 100 parts of acetone is poured into a mixture of 100 parts of ice and 100 parts of water, and a solution of 47.6 parts of 4-nitro-4'-aminostilbene-2:2'-disulfonic acid (84 percent strength) in 400 parts of water and neutralized with sodium hydroxide is added dropwise, while stirring, in the course of 10 minutes to the above suspension at 0–5° C. Then, a solution of 5.5 parts of sodium carbonate in 50 parts of water is added dropwise to the resulting reaction mixture in the course of 1 hour in such manner that the mixture has a neutral to weakly acid reaction throughout. 8 parts of an aqueous mono-methylamine solution of 40 percent strength are then added, the temperature is raised in the course of 1 hour to 35° C., and the whole is stirred at that temperature for 3 hours. The hydrochloric acid formed in neutralized by the gradual addition of a solution of 5.5 parts of sodium carbonate in 50 parts of water. Finally, 15 parts of mono-ethanolamine are added to the reaction mixture, the temperature is raised to 70° C., and the whole is stirred at this temperature for 6 hours. The condensation product so formed is precipitated by the addition of sodium chloride, and separated by filtration, washed neutral with sodium chloride solution and then reduced. For the latter purpose the product is introduced at 90–100° C. in the course of 1 hour into a mixture of 15 parts of glacial acetic acid, 66 parts of iron filings and 500 parts of water. As soon as the nitro body has disappeared the reaction mixture is rendered alkaline with sodium carbonate at 50–60° C., filtered, and the resulting 4-amino-4'-[2-methylamino-4-(β-hydroxyethylamino)-1:3:5-triazyl-(6)-amino]-stilbene-2:2'-disulfonic acid is precipitated from the filtrate by the addition of dilute hydrochloric acid, the product is separated by filtration, washed free from mineral acid by means of water and dried.

Example 5

A solution of 18.5 parts of 4:4'-diaminostilbene-2:2'-disulfonic acid is added at 0–5° C. in the course of about 10 minutes to 18.5 parts of cyanuric chloride, which are suspended in a finely divided form in a mixture consisting of 50 parts of acetone, 100 parts of water and 100 parts of ice. A solution of 5.5 parts of sodium carbonate in 50 parts of water is then introduced dropwise in the course of 1 hour in such manner that the reaction mixture is maintained weakly acid to neutral throughout, the temperature being allowed to rise slowly to 10° C. at the same time. To the neutral reaction mixture obtained in this manner and containing no starting material 7.8 parts of thioethylene glycol are added at 8–10° C. and then a solution of 4 parts of sodium hydroxide in 100 parts of water is added in the course of 1 hour so that the reaction mixture is maintained neutral to weakly alkaline throughout, while the temperature is allowed to rise to 20–25° C. 11 parts of diethanolamine are then added, the temperature is raised in the course of 1–2 hours to 70° C., and the whole is stirred for 6 hours at that temperature while neutralizing the hydrochloric acid formed with 5.3 parts of sodium carbonate in 50 parts of water. After cooling the resulting condensation product is precipitated by the addition of sodium chloride, and the product is separated by filtration and dried. The resulting disodium salt of 4:4′-bis-[2-(β-hydroxyethylthio)-4-bis-(β-hydroxyethyl)-amino-1:3:5-triazyl-(6)-amino]-stilbene - 2:2′-disulfonic acid of the formula

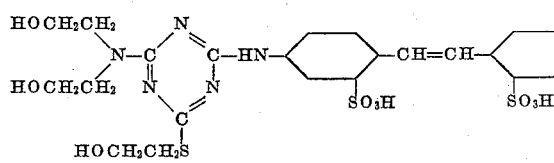

is a pale yellow powder soluble in water, which when applied to cellulose material from solution exhibits in ultraviolet light a bluish fluorescence.

Example 6

A solution, neutralized with sodium carbonate, of 18.5 parts of 4:4′-diaminostilbene-2:2′-disulfonic acid is added in the course of about 10 minutes at 0.5° C. to 18.5 parts of cyanuric chloride suspended in finely divided form in a mixture consisting of 50 parts of acetone, 100 parts of water and 100 parts of ice. A solution of 5.5 parts of sodium carbonate in 50 parts of water is then added dropwise in the course of 1 hour so that the reaction mixture is maintained weakly acid to neutral throughout, the temperature being allowed to rise slowly to 10° C. at the same time. To the neutral reaction mixture so obtained and containing no more starting material, are added 11 parts of thiophenol, the temperature is raised to 40° C. and the whole is stirred for 4 hours at this temperature, while 100 parts of a normal solution of caustic soda are added dropwise at the same time so that the reaction mass is maintained neutral to weakly alkaline throughout. To the neutral mixture 7 parts of mono-ethanolamine are added, the temperature is raised to 70–75° C. in the course of 1–2 hours, the whole is stirred at this temperature for 5 hours while the hydrochloric acid formed is neutralized by the gradual addition of a solution of 5.3 parts of sodium carbonate in 50 parts of water. The whole is then allowed to cool, sodium chloride solution is added, the precipitated condensation product is separated by filtration, washed with sodium chloride solution and the resulting disodium salt of 4:4′-bis-[2-phenyl-thio-4-(β-hydroxyethylamino)-1:3:5-triazyl-(6) - amino]-stilbene-2:2′-disulfonic acid of the formula

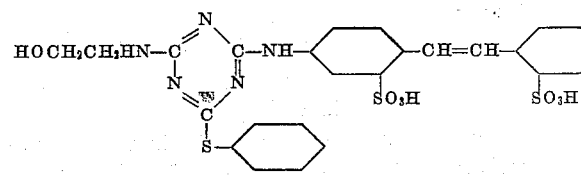

is dried. It is a pale yellow powder which is soluble in water. Wool which has been treated with an aqueous solution of this product in the presence of an acid, for example, acetic acid, has a whiter appearance than wool which has been treated without this addition. By using instead of mono-ethanolamine, an equivalent quantity of morpholine, or, instead of thiophenol an equivalent quantity of 2:5-dimethyl-thiophenol, or 2-mercapto-thiazoline of the formula

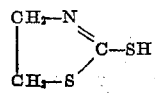

there are obtained products having similar properties, for example the disodium salt of 4:4′-bis-[2-(2:5-dimethyl-phenylthio) - 4-morpholino-1:3:5-triazyl-(6)-amino]-stilbene-2:2′-disulfonic acid, the disodium salt of 4:4′-bis-[2-

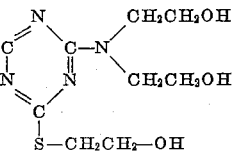

(2-mercapto-thiazolino)-4-(β-hydroxyethylamino)-1:3:5-triazyl-(6)-amino]-stilbene-2:2′-disulfonic acid or the disodium salt of 4:4′-bis-[2-(2-mercapto-thiazolino)-4-morpholino-1:3:5-triazyl-(6)-amino]-stilbene-2:2′ - disulfonic acid.

Example 7

6.1 parts of 4-amino-4′-[2-ethylamino-4-(ortho-anisidino)-1:3:5-triazyl-(6)-amino]-stilbene-2:2′ - disulfonic acid of the formula

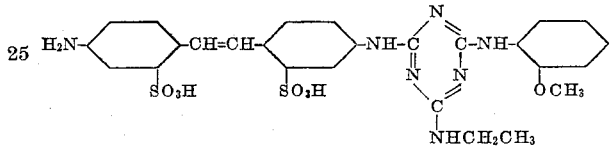

are condensed in the manner described in Example 4 with 1.9 parts of cyanuric chloride. As soon as the starting material can no longer be detected 0.95 part of phenol is added, the temperature of the reaction mixture is allowed to rise to 35° C., and 10 parts of a normal solution of caustic soda are slowly introduced dropwise in the course of 3 hours so that the reaction mixture is maintained neutral to weakly alkaline throughout. 0.7 part of mono-ethanolamine is then added to the neutral reaction mixture, the temperature is raised to 70–75° C., and stirring is continued for 6 hours at this temperature while the hydrochloric acid formed is neutralized by the gradual addition of 0.5 part of sodium carbonate in 5 parts of water. The whole is then allowed to cool, sodium chloride is added, and the precipitated condensation product is separated by filtration, washed with sodium chloride solution and dried. The resulting disodium salt of 4-[2-phenoxy-4-(β-hydroxyethylamino)-1:3:5-triazyl-(6)-amino]-4′-[2-ethylamino-4-(ortho-anisidino) - 1:3:5-triazyl-(6)-amino]-stilbene-2:2′-disulfonic acid of the formula

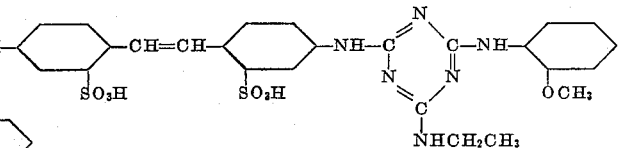

is a pale powder which dissolves in water to give a bluish fluorescence in ultraviolet light.

By using instead of 0.95 part of phenol an equivalent quantity of α-naphthol or, instead of 4-amino-4′-[2-ethylamino-4-(ortho-anisidino)-1:3:5-triazyl-(6)-amino] - stilbene-2:2′-disulfonic acid, an equivalent quantity of 4-amino - 4′-[2 - ethylamino-4-(orthochloranilino) - 1:3:5-triazyl-(6)-amino]-stilbene-2:2′-disulfonic acid there are obtained products having similar properties, for example, the disodium salt of 4-[2-(α-naphthoxy-4-(β-hydroxyethylamino)-1:3:5-triazyl-(6)-amino]-4'-[2-ethylamino-4-(ortho-anisidino)-1:3:5-triazyl-(6)-amino]-stilbene-2:2'-disulfonic acid.

The 4-amino-4'-[2-ethylamino-4-(ortho-anisidino)-1:3:5-triazyl-(6)-amino]-stilbene-2:2'-disulfonic acid used as starting material can be obtained in a manner analogous to that described in Example 4 for making 4-amino-4'-[2-methyl-amino-4-(β-hydroxyethylamino)-1:3:5-triazyl-(6)-amino]-stilbene-2:2'-disulfonic acid, by condensing 1 molecular proportion of 4-nitro-4'-aminostilbene-2:2'-disulfonic acid with 1 molecular proportion of cyanuric chloride, 1 molecular proportion of ethylamine and 1 molecular proportion of ortho-anisidine and then reducing the resulting product.

Example 8

The disodium salt of 4-nitro-4'-[2:4-dichloro-1:3:5-triazyl-(6)-amino]-stilbene-2:2'-disulfonic acid is prepared by the procedure described in Example 4 from 19 parts of cyanuric chloride and 47.6 parts of 4-nitro-4'-aminostilbene-2:2'-disulfonic acid of 84 percent strength. To the neutral reaction mixture free from starting material 9.5 parts of phenol are added, the temperature is raised to 40° C., the whole is stirred at this temperature while 100 parts of a normal solution of caustic soda is run in in such manner that the reaction mixture is maintained neutral to weakly alkaline. After the addition of 18 parts of mono-ethanolamine the temperature is raised to 60–65° C., and the whole is stirred for 18 hours at that temperature. After cooling, sodium chloride solution is added to the reaction mixture, the precipitated condensation product is separated by filtration, washed with sodium chloride solution and reduced as described in Example 4.

The 4-amino-4'-[2-phenoxy-4-(β-hydroxyethylamino)-1:3:5-triazyl-(6)-amino]-stilbene-2:2'-disulfonic acid washed free from mineral acid is stirred with 500 parts of water and neutralized by the addition of sodium carbonate. The solution so obtained is added at 0–5° C. in the course of 10 minutes to a finely divided aqueous suspension of 18.5 parts of cyanuric chloride, and the reaction mass is then neutralized at 0–10° C. with a solution of 5.5 parts of sodium carbonate in 50 parts of water. As soon as the starting material has disappeared, 25 parts of diethanolamine are added, the temperature of the reaction mixture is raised to 35° C. and the whole is stirred for 4 hours at that temperature. After cooling, sodium chloride solution is added, the condensation product so precipitated is separated by filtration, washed with sodium chloride solution and dried. The resulting disodium salt of 4-[2-phenoxy-4-(β-hydroxyethylamino)-1:3:5-triazyl-(6)-amino]-4'-[2-chloro-4-(bis-β-hydroxyethyl)-amino-1:3:5-triazyl-(6)-amino]-stilbene-2:2'-disulfonic acid of the formula

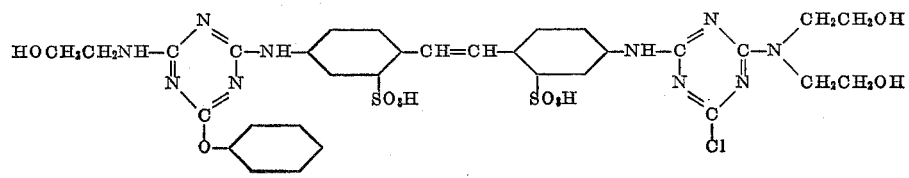

is a pale yellow powder soluble in water.

A mixture of products having similar properties to those of the compound described above is obtained by condensing 1 molecular proportion of 4:4'-diaminostilbene-2:2'-disulfonic acid with 2 molecular proportions of cyanuric chloride, then reacting the condensation product with 1 molecular proportion of phenol and finally with 1 molecular proportion each of diethanolamine and ethanolamine.

Example 9

By the procedure described in Example 4 there is obtained 4-amino-4'-[2:4-di(ortho-chloranilino)-1:3:5-triazyl-(6)-amino]-stilbene-2:2'-disulfonic acid by condensing 1/10 of a molecular proportion of 4-nitro-4'-aminostilbene-2:2'-disulfonic acid, 1/10 of a molecular proportion of cyanuric chloride and 2/10 of a molecular proportion of ortho-chloraniline and subsequently reducing the product. 7 parts of the acid so obtained are stirred with 70 parts of water and neutralized by the addition of sodium carbonate. The solution so obtained is run at 0–5° C. in the course of 10 minutes into a finely divided aqueous suspension of 1.9 parts of cyanuric chloride, and a solution of 0.5 part of sodium carbonate in 5 parts of water is then slowly added to the reaction mass at 0–10° C. As soon as the starting material has disappeared, 0.5 part of monoethylamine is added, and the reaction temperature is raised to 35° C., and maintained thereat for 4 hours. The hydrochloric acid formed is neutralized by the addition of a solution of 0.5 part of sodium carbonate in 5 parts of water. There are then added 2.3 parts of the sodium salt of para-hydroxybenzene sulfonic acid, the reaction temperature is raised to 80–85° C., and the whole is stirred for 10 hours at this temperature while 10 parts of a normal solution of caustic soda are added dropwise so that the reaction mass is maintained neutral to weakly alkaline. After the addition of sodium chloride solution, the whole is allowed to cool, and the precipitated condensation product is separated by filtration, washed with sodium chloride solution and dried. The resulting trisodium salt of 4-[2-(para-sulfophenoxy)-4-ethylamino-1:3:5-triazyl-(6)-amino]-4'-[2:4-di(ortho-chloranilino)-1:3:5-triazyl-(6)-amino]-stilbene-2:2'-disulfonic acid of the formula

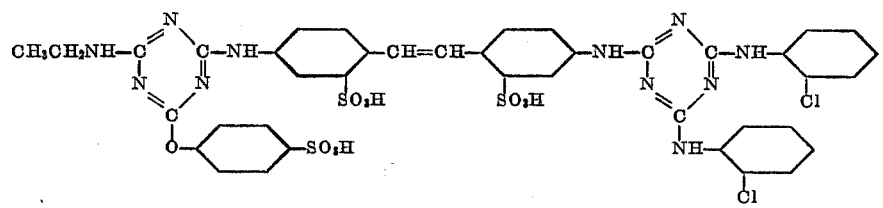

is a pale yellow powder which in aqueous solution exhibits a bluish fluorescence in ultraviolet light.

Example 10

8.7 parts of the disodium salt of 4-[2-chloro-4-(β-hydroxyethylamino)-1:3:5-triazyl-(6)-amino]-4'-[2:4-di(bis-β-hydroxyethyl)-amino-1:3:5-triazyl-(6)-amino]-stilbene-2:2'-disulfonic acid are stirred with 90 parts of water at 40–50° C. 2 parts of 2-mercapto-benzthiazole are added. The reaction temperature is raised to 75° C.

15 and the whole is stirred at this temperature for 6 hours, while 10 parts of a normal solution of caustic soda is allowed to run in so that the reaction mixture is maintained neutral to weakly alkaline. After cooling sodium chloride solution is added, and the precipitated condensation product is separated by filtration, washed with sodium chloride solution and dried. The resulting disodium salt of 4-[2-(2-mercapto-benzthiazolyl) - 4 - (β-hydroxyethylamino)-1:3:5-triazyl-(6)-amino] - 4' - [2:4-di-(bis-β-hydroxyethyl)-amino - 1:3:5 - triazyl-(6)-amino]-stilbene-2:2'-disulfonic acid of the formula

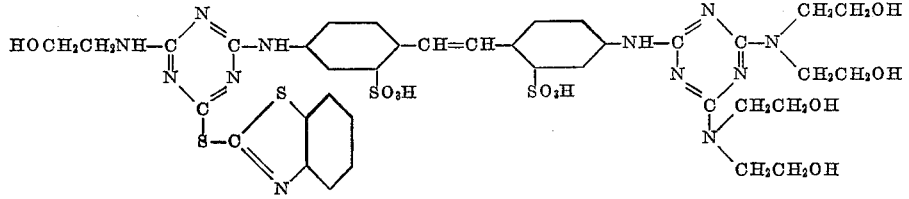

is a yellow powder soluble in water.

By using, instead of 2-mercapto-benzthiazole an equivalent quantity of the sodium salt of thioglycollic acid there is obtained the trisodium salt of 4-[2-(thioglycollyl) - 4 - (β-hydroxyethylamino) - 1:3:5 - triazyl-(6)-amino] - 4' - [2:4-di-(bis-β-hydroxyethyl)-amino - 1:3:5-triazyl-(6)-amino]-stilbene-2:2'-disulfonic acid which has similar properties.

A product with similar properties is also obtained by using instead of 4-[2-chloro-4-(β-hydroxyethylamino)-1:3:5 - triazyl - (6) - amino] - 4' - [2:4 - di - (bis - β-hydroxyethyl) - amino - 1:3:5 - triazyl - (6) - amino]-stilbene-2:2'-disulfonic acid, 4-[2-chloro-4(β-hydroxyethylamino) - 1:3:5 - triazyl - (6) - amino] - 4' - [2 - amino 4 - (bis - β - hydroxyethylamino - 1:3:5 - triazyl - (6)-amino]-stilbene-2:2'-disulfonic acid, which can be prepared by reacting 1 molecular proportion of 4-nitro-4'-[2:4-dichloro-1:3:5-triazyl-(6)-amino]-stilbene-2:2' - disulfonic acid with 1 molecular proportion each of ammonia and diethanolamine, reducing the nitro group to the amino group, condensing the reduction product with 1 molecular proportion of cyanuric chloride and reacting the condensation product with 1 molecular proportion of ethanolamine.

Furthermore, there are obtained products with similar properties by using as starting materials 4-[2-chloro-4-(β-hydroxyethylamino) - 1:3:5 - triazyl - (6) - amino]-4' - [2 - morpholino - 4 - (bis - β - hydroxyethylamino)-1:3:5-triazyl-(6)-amino]-stilbene-2:2'-disulfonic acid, 4-[2 - chloro - 4 - (ortho - anisidino) - 1:3:5 - triazyl - (6)-amino] - 4' - [2:4 - di - (bis - β - hydroxyethylamino)-1:3:5-triazyl-(6)-amino]-stilbene-2:2'-disulfonic acid or 4 - [2 - chloro - 4 - (β - hydroxyethylamino) - 1:3:5 - triazyl - (6) - amino] - 4' - [2 - phenoxy - 4 - (bis - β - hydroxyethylamino) - 1:3:5 - triazyl - (6) - amino] - stilbene-2:2'-disulfonic acid.

Example 11

Undyed cotton yarn is treated at a goods-to-liquor ratio of 1:30 for about ¼ hour at room temperature in a bath containing, per liter, 0.01 gram of the condensation product obtained as described in Example 1. After rinsing and drying the yarn so treated has a greater whiteness than the material not so treated.

Example 12

Undyed wool is treated at a goods-to-liquor ratio of 1:40 for ½ hour at 40–45° C. in a bath containing, per liter, 0.05 gram of the condensation product obtained as described in Example 2 and 1.25 grams of formic acid. After rinsing and drying, the wool so treated has a greater whiteness than the original material not so treated.

16

Example 13

The sodium salt of 2-heptadecyl-N-benzyl-benzimidazyl disulfonic acid is mixed with 0.05–0.5 percent of its weight of the condensation product obtained as described in Example 3. Undyed textile goods, which have been washed in the usual manner with the resulting mixture, exhibit a brighter appearance than textile goods which have been washed with the aforesaid sodium salt alone.

Example 14

Cotton is washed at the boil at a goods-to-liquor ratio of 1:40 in a bath containing, per liter, 10 grams of a washing preparation having the following composition:

33.3% of soap,
11.0% of calcined sodium carbonate,
14.0% of sodium pyrophosphate,
7.0% of sodium perborate,
3.0% of magnesium silicate,
0.1% of the product obtainable as described in Example 7,
31.6% of water.

The cotton is then rinsed and dried. It has a whiter appearance than cotton which has been washed with a washing preparation of the same composition except that it does not contain the addition of the product obtained as described in Example 7.

What is claimed is:

1. An optical bleaching preparation which contains at least one washing agent and at least one optical bleaching agent consisting essentially of a water-soluble salt of a colorless to substantially colorless derivative of 4:4'-diamino-stilbene-2:2'-disulfonic acid of the formula

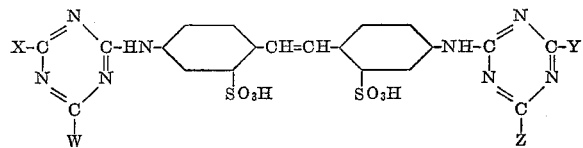

in which W represents a member selected from the group consisting of aromatic radicals containing at most two carbocyclic rings and being bound to the carbon atom of the triazine ring by an —O-bridge, lower alkyl radicals, lower hydroxyalkyl radicals, aromatic radicals containing one carbocyclic ring and heterocyclic radicals containing at most two rings and being bound to the carbon atom of the triazine ring by an —S-bridge, X and Y each represents a radical of nitrogenous base, which base contains at least one hydrogen atom attached to the nitrogen atom and is selected from the group consisting of ammonia, lower alkylamines, lower hydroxyalkyl)-amines, lower N':N'-dialkyl-alkylene diamines, aromatic amines containing at most two carbocyclic rings and heterocyclic amines containing one ring of which the amine nitrogen atom is a ring member, the radicals of said nitrogenous bases being attached by the nitrogen atom to the triazine ring, and Z represents a member of the group consisting of a chlorine atom and of radicals of the kind represented by W, X and Y, all substituents being free from groups imparting dyestuff characteristics to the molecule.

2. A process for enhancing the brightness of organic fibrous material which comprises impregnating the material with an aqueous solution of an optical bleaching agent consisting essentially of a water-soluble salt of a colorless to substantially colorless derivative of 4:4'-diamino-stilbene-2:2'-disulfonic acid of the formula

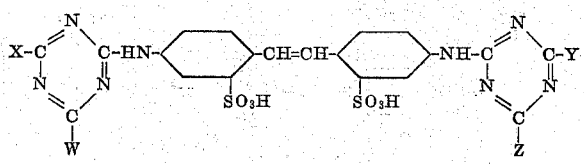

in which W represents a member selected from the group consisting of aromatic radicals containing at most two carbocyclic rings and being bound to the carbon atom of the triazine ring by an —O-bridge, lower alkyl radicals, lower hydroxyalkyl radicals, aromatic radicals containing one carbocyclic ring and heterocyclic radicals containing at most two rings and being bound to the carbon atom of the triazine ring by an —S-bridge, X and Y each represents a radical of a nitrogenous base, which base contains at least one hydrogen atom attached to the nitrogen atom and is selected from the group consisting of ammonia, lower alkylamines, lower (hydroxyalkyl)-amines, lower N':N'-dialkyl-alkylene-diamines, aromatic amines containing at most two carbocyclic rings and heterocyclic amines containing one ring of which the amine nitrogen atom is a ring member, the radicals of said nitrogenous bases being attached by the nitrogen atom to the triazine ring, and Z represents a member of the group consisting of a chlorine atom and of radicals of the kind represented by W, X and Y, all substituents being free from groups imparting dyestuff characteristics to the molecule.

3. A process for enhancing the brightness of organic fibrous material which comprises impregnating the material with an aqueous solution of an optical bleaching agent consisting essentially of a water-soluble salt of a colorless to substantially colorless derivative of 4:4'-diamino-stilbene-2:2'-disulfonic acid of the formula

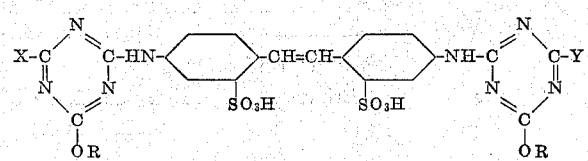

in which X and Y each represents a radical of a nitrogenous base, which base contains at least one hydrogen atom attached to the nitrogen atom and is selected from the group consisting of ammonia, lower alkylamines, lower (hydroxyalkyl)-amines, lower N':N'-dialkyl-alkylene diamines, aromatic amines containing at most two carbocyclic rings and heterocyclic amines containing one ring of which the amine nitrogen atom is a ring member, the radicals of said nitrogenous bases being attached by the nitrogen atom to the triazine ring, and R represents a radical of the benzene series, all substituents being free from group imparting dyestuff characteristics to the molecule, and subsequently drying the impregnated material.

4. A process for enhancing the brightness of organic fibrous material which comprises impregnating the material with an aqueous solution of an optical bleaching agent consisting essentially of a water-soluble salt of a colorless to substantially colorless derivative of 4:4'-diamino-stilbene-2:2'-disulfonic acid of the formula

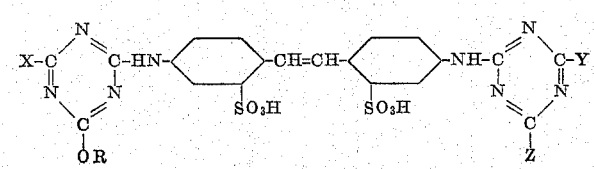

in which X, Y and Z each represent a radical of a nitrogenous base, which base contains at least one hydrogen atom attached to the nitrogen atom and is selected from the group consisting of ammonia, lower alkylamines, lower (hydroxyalkyl)-amines, lower N':N'-dialkyl-alkylene diamines, aromatic amines containing at most two carbocyclic rings and heterocyclic amines containing one ring of which the amine nitrogen atom is a ring member, the radicals of said nitrogenous bases being attached by the nitrogen atom to the triazine ring, and R represents a radical of the benzene series, all substituents being free from groups imparting dyestuff characteristics to the molecule, and subsequently drying the impregnated material.

5. A process for enhancing the brightness of organic fibrous material which comprises impregnating the material with an aqueous solution of an optical bleaching agent consisting essentially of a water-soluble salt of a colorless to substantially colorless derivative of 4':4'-diamino-stilbene-2:2'-disulfonic acid of the formula

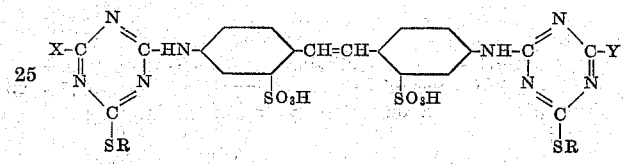

in which X and Y each represents a radical of a nitrogenous base, which base contains at least one hydrogen atom attached to the nitrogen atom and is selected from the group consisting of ammonia, lower alkylamines, lower (hydroxyalkyl)-amines, lower N':N'-dialkyl-alkylene diamines, aromatic amines containing at most two carbocyclic rings and heterocyclic amines containing one ring of which the amine nitrogen atom is a ring member, the radicals of said nitrogenous bases being attached by the nitrogen atom to the triazine ring and R represents a member selected from the group consisting of lower alkyl radicals, lower hydroxyalkyl radicals, aromatic radicals containing one carbocyclic ring and heterocyclic radicals containing at most two rings, all substituents being free from groups imparting dyestuff characteristics to the molecule, and subsequently drying the impregnated material.

6. A process for enhancing the brightness of organic fibrous material which comprises impregnating the material with an aqueous solution of an optical bleaching agent consisting essentially of a water-soluble salt of a colorless to substantially colorless derivative of 4:4'-diamine-2:2'-disulfonic acid of the formula

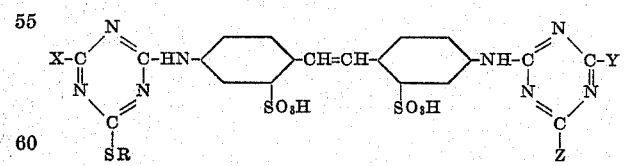

in which X, Y and Z each represents a radical of a nitrogenous base, which base contains at least one hydrogen atom attached to the nitrogen atom and is selected from the group consisting of ammonia, lower alkylamines, lower (hydroxyalkyl)-amines, lower N':N'-dialkyl-alkylene diamines, aromatic amines containing at most two carbocyclic rings and heterocyclic amines containing one ring of which the amine nitrogen atom is a ring member, the radicals of said nitrogenous bases being attached by the nitrogen atom to the triazine ring and R represents a member selected from the group consisting of lower alkyl radicals, lower hydroxyalkyl radicals, aromatic radicals containing one carbocyclic ring and heterocyclic radicals containing at most two rings, all substituents being free from groups imparting dyestuff characteristics to the molecule, and subsequently drying the impregnated material.

7. A process for enhancing the brightness of organic fibrous material which comprises impregnating the material with an aqueous solution of an optical bleaching agent consisting essentially of an alkali metal salt of 4:4'-bis - [2 -phenoxy - 4 - ethylamino - 1:3:5 - triazyl - (6) - amino]-stilbene-2:2'-disulfonic acid and subsequently drying the impregnated material.

8. A process for enhancing the brightness of organic fibrous material which comprises impregnating the material with an aqueous solution of an optical bleaching agent consisting essentially of an alkali metal salt of 4:4'-bis - [2 - phenoxy - 4 - (β - hydroxyethylamino) - 1:3:5-triazyl - (6) - amino] - stilbene - 2:2' - disulfonic acid and subsequently drying the impregnated material.

9. A process for enhancing the brightness of organic fibrous material which comprises impregnating the material with an aqueous solution of an optical bleaching agent consisting essentially of an alkali metal salt of 4-[2-phenoxy - 4 - (β - hydroxyethylamino) - 1:3:5 - triazyl-(6) - amino] - 4' - [2 - ethylamino - 4 - (ortho - anisidino) - 1:3:5 - triazyl - (6) - amino] - stilbene - 2:2'- disulfonic acid and subsequently drying the impregnated material.

10. A process for enhancing the brightness of organic fibrous material which comprises impregnating the material with an aqueous solution of an optical bleaching agent consisting essentially of an alkali metal salt of 4:4'-bis - [2 - phenylthio - 4 - (β - hydroxyethylamino)-1:3:5 - triazyl - (6) - amino] - stilbene - 2:2' - disulfonic acid and subsequently drying the impregnated material.

11. A process for enhancing the brightness of organic fibrous material which comprises impregnating the material with an aqueous solution of an optical bleaching agent consisting essentially of an alkali metal salt of 4-[2-(2 - mercapto - benzthiazolyl) - 4 - (β - hydroxyethylamino) - 1:3:5 - triazyl - (6) - amino] - 4' - [2:4 - di-(bis - β - hydroxyethylamino) - 1:3:5 - triazyl - (6)-amino] - stilbene - 2:2' - disulfonic acid and subsequently drying the impregnated material.

12. Fluorescent agents which in the form of the free acid have the formula

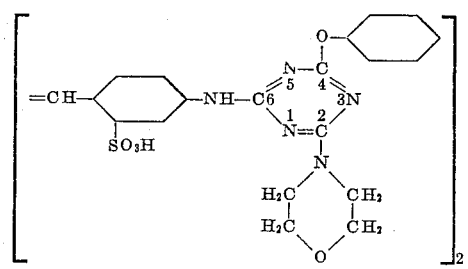

13. An optical bleaching preparation which contains at least one washing agent and an optical bleaching agent consisting essentially of an alkali metal salt of 4:4' - bis-[2 - phenoxy - 4 - ethylamino - 1:3:5 - triazyl - (6)-amino]-stilbene-2:2'-disulfonic acid.

14. An optical bleaching preparation which contains at least one washing agent and an optical bleaching agent consisting essentially of an alkali metal salt of 4:4'-bis-[2 - phenoxy - 4 - (β - hydroxyethylamino) - 1:3:5-triazyl-(6)-amino]-stilbene-2:2'-disulfonic acid.

15. An optical bleaching preparation which contains at least one washing agent and an optical bleaching agent consisting essentially of an alkali metal salt of 4-[2-phenoxy - 4 - (β - hydroxyethylamino) - 1:3:5 - triazyl - (6)-amino] - 4' - [2 - ethylamino - 4 - (ortho - anisidino)-1:3:5-triazyl-(6)-amino]-stilbene-2:2'-disulfonic acid.

References Cited in the file of this patent
UNITED STATES PATENTS

| | | |
|---|---|---|
| 564,835 | Newman | July 28, 1896 |
| 2,171,427 | Eggert | Aug. 29, 1939 |
| 2,221,361 | Schmid | Nov. 12, 1940 |
| 2,368,844 | Keller | Feb. 6, 1945 |
| 2,376,743 | Wendt | May 22, 1945 |
| 2,473,475 | Keller | June 14, 1949 |
| 2,539,766 | Zweidler | Jan. 30, 1951 |

FOREIGN PATENTS

| | | |
|---|---|---|
| 596,405 | Great Britain | Jan. 2, 1948 |

UNITED STATES PATENT OFFICE
CERTIFICATE OF CORRECTION

Patent No. 2,846,397                                       August 5, 1958

Franz Ackermann

It is hereby certified that error appears in the printed specification of the above numbered patent requiring correction and that the said Letters Patent should read as corrected below.

Column 1, line 40, for "of" read -- or --; line 43, for "of", second occurrence, read -- or --; line 55, for "chloride of" read -- chloride or --; same line, for "bromine" read -- bromide --; line 57, for "salts" read -- salt --; line 62, for "bromine" read -- bromide --; column 7, line 15, for "ofg" read -- of --; column 10, line 19, for "in neutralized" read -- is neutralized --; column 16, line 59, for "of nitrogenous" read -- of a nitrogenous --; line 62, for "hydroxyalkyl)-amines" read -- (hydroxyalkyl)-amines --.

Signed and sealed this 14th day April 1959.

(SEAL)
Attest:

KARL H. AXLINE                                       ROBERT C. WATSON
Attesting Officer                                    Commissioner of Patents